United States Patent
Briden et al.

(10) Patent No.: US 9,176,628 B2
(45) Date of Patent: Nov. 3, 2015

(54) DISPLAY WITH AN OPTICAL SENSOR

(75) Inventors: John J. Briden, San Francisco, CA (US); Bradley Neal Suggs, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 962 days.

(21) Appl. No.: 13/384,544

(22) PCT Filed: Jul. 23, 2009

(86) PCT No.: PCT/US2009/051599
§ 371 (c)(1),
(2), (4) Date: Jan. 17, 2012

(87) PCT Pub. No.: WO2011/011009
PCT Pub. Date: Jan. 27, 2011

(65) Prior Publication Data
US 2012/0113062 A1      May 10, 2012

(51) Int. Cl.
    G06F 3/042      (2006.01)
    G06F 3/03       (2006.01)
    G06F 3/0488     (2013.01)
    G06F 3/01       (2006.01)

(52) U.S. Cl.
    CPC .............. *G06F 3/0428* (2013.01); *G06F 3/017* (2013.01); *G06F 3/0304* (2013.01); *G06F 3/0488* (2013.01); *G06F 2203/04101* (2013.01); *G06F 2203/04806* (2013.01)

(58) Field of Classification Search
    CPC .................................................. G06F 3/04883
    See application file for complete search history.

(56) References Cited

U.S. PATENT DOCUMENTS

| | | | |
|---|---|---|---|
| 5,579,037 A | 11/1996 | Tahara et al. | |
| 2006/0139314 A1* | 6/2006 | Bell | 345/156 |
| 2007/0089915 A1 | 4/2007 | Ogawa et al. | |
| 2007/0252898 A1 | 11/2007 | Delean | |
| 2008/0007542 A1* | 1/2008 | Eliasson et al. | 345/176 |
| 2008/0100572 A1 | 5/2008 | Boillot | |
| 2008/0120568 A1 | 5/2008 | Jian et al. | |
| 2008/0150913 A1 | 6/2008 | Bell et al. | |
| 2009/0102800 A1 | 4/2009 | Keenan | |
| 2009/0128498 A1 | 5/2009 | Hollemans et al. | |
| 2009/0187824 A1* | 7/2009 | Hinckley et al. | 715/711 |
| 2009/0213094 A1 | 8/2009 | Bridger | |

FOREIGN PATENT DOCUMENTS

| | | |
|---|---|---|
| CN | 1997958 A | 7/2007 |
| CN | 101300520 | 11/2008 |

(Continued)

OTHER PUBLICATIONS

"3D Head Tracking Based on Recognition and Interpolation Using a Time-Of-Flight Depth Sensor", Salih Burak Göktörk1 and Carlo Tomasi, Canasta Inc., Duke University, 7 p.

(Continued)

*Primary Examiner* — Gerald Johnson
(74) *Attorney, Agent, or Firm* — Hewlett-Packard Patent Department

(57) ABSTRACT

A display system can include a panel 110 and a three dimensional optical sensor. The three dimensional optical sensor 115 can be to determine depth of an object located in the field of view of the three dimensional optical sensor. A transparent layer 105 can be in front of the panel and the three dimensional optical sensor.

18 Claims, 4 Drawing Sheets

(56) References Cited

FOREIGN PATENT DOCUMENTS

| KR | 2007-0037773 | 4/2007 |
| TW | 200849212 A | 12/2008 |
| WO | WO-2009/028892 A2 | 3/2009 |

OTHER PUBLICATIONS

Canesta, Why3D?, "3D Vision Enables Everyday Devices to "See"", Salih Burak Gokturk, et al, Whitepaper, Apr. 2008 r1.0, 10 p.

International Searching Authority, International Search Report and Written Opinion, Application No. PCT/US2009/051599, Date of Mailing Apr. 21, 2010, 12 p.

Office Action, GB Application No. 1200636.7, Date issued: Dec. 23, 2014, pp. 1-4.

Final Office Action, U.S. Appl. No. 13/386,433, Date Issued: Mar. 6, 2015, pp. 1-29.

* cited by examiner

DISPLAY WITH AN OPTICAL SENSOR

BACKGROUND

A resistive touch screen panel is composed of two thin, metallic, electrically conductive layers separated by a narrow gap. When an object, such as a finger, presses down on a point on the panel's outer surface the two metallic layers become connected at that point and the panel then behaves as a pair of voltage dividers with connected outputs. This causes a change in the electrical current which is registered as a touch event and sent to the controller for processing. A capacitive touch screen panel is a sensor that is a capacitor in which plates include overlapping areas between the horizontal and vertical axes in a grid pattern. The human body also conducts electricity and a touch on the surface of the sensor will affect the electric field and create a measurable change in the capacitance of the device.

BRIEF DESCRIPTION OF THE DRAWINGS

Some embodiments of the invention are described with respect to the following figures.

DETAILED DESCRIPTION

Figure 1A:
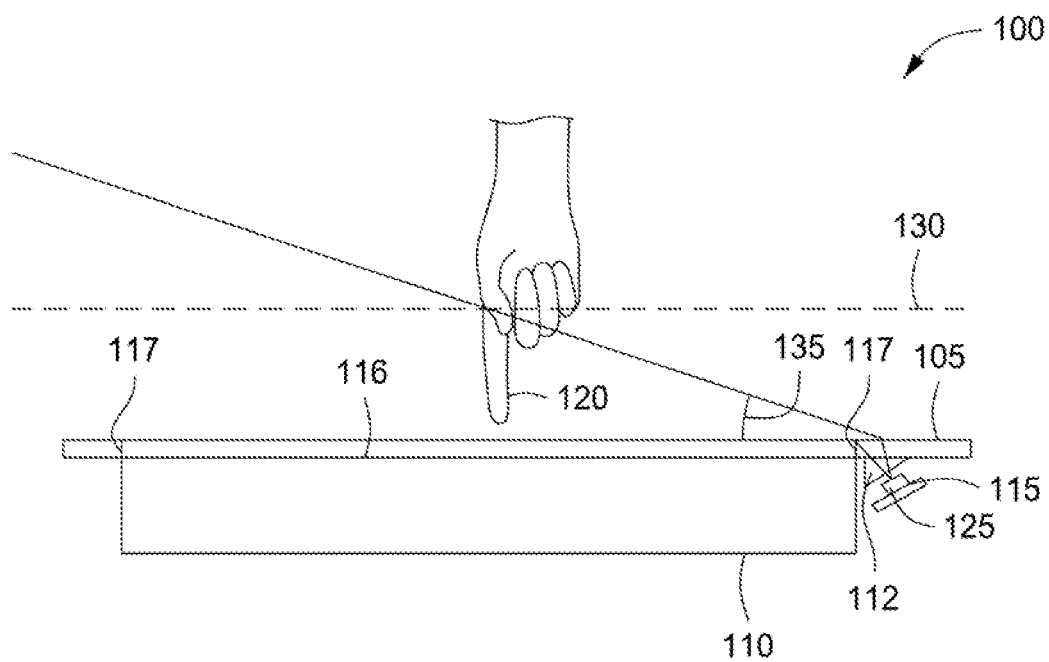
FIG. 1a is a display according to an exemplary embodiment of the invention.

A graphical user interface (GUI) can use a pointing device such as a mouse to move a cursor to an object on the display. If the cursor is pointing to an object on the display, which may be known as a mouse over event or hover event, information about the object can be displayed. The information can include a pop-up text box in some embodiments. In other embodiments the cursor pointing to an object can perform other functions such as highlighting the object. The function that is performed by the computer depends on the programming of the interface and the application.

Touch screens can be used to move a cursor on a display but may not distinguish between moving the cursor on the display to an item, a hover event, and activating the item. A display that can detect an object that is not contacting the display and an object that is contacting the display could distinguish between a hover event, where a cursor is pointing at an item on the display, and activating the item on the display.

In one embodiment the display includes a three dimensional optical sensor to determine the depth an object that is captured by the optical sensor is from the optical sensor. The distance the object is from the display can be calculated from the distance the object is from the optical sensor.

The resistive touch screen panel includes a glass panel that is covered with a conductive and a resistive metallic layer. These two layers are held apart by spacers, and a scratch-resistant layer is placed on top. An electrical current runs through the two layers while the display is operational. When a user touches the screen, the two layers make contact in that exact spot. The change in the electrical field is rioted and the coordinates of the point of contact are calculated by the computer. In a capacitive system, a layer that stores electrical charge is placed on the glass panel of the display. When a user touches the display with their finger, some of the charge is transferred to the user, so the charge on the capacitive layer decreases. This decrease is measured in circuits located at each corner of the display. The layers covering the glass panels reduce the amount of light that travels thought the glass layer from the display panel to the user and degrades the optical clarity of the image.

Two dimensional optical touch systems may be used to determine where on a screen a touch occurs. A two dimensional optical touch system may include a light source that travels across the surface of the display and is received at the opposite side of the display. If an object interrupts the light then the receiver does not receive the light and a touch is registered at the location where light from two sources that are interrupted intersect. The light source and the receiver in an optical touch system are mounted in front of the transparent layer to allow the beams to travel along the surface of the transparent layer. Some optical sensors appear as a small wall around the perimeter of the display. Mounting the light sources and receivers in front of the glass allows contaminants to interfere with the light that is transmitted between the source and the receivers. The contaminants can be for example dust or dirt.

The resistive, capacitive and the two dimensional optical touch systems can determine the XY coordinate when an object contacts or is close to the display. The resistive, capacitive and the two dimensional optical touch systems do not determine the Z dimension (third dimension), the distance from the display.

In one embodiment, a three dimensional optical sensor is mounted behind a transparent layer of a display. The three dimensional optical sensor can be mounted outside of the perimeter of the panel of the display system. Mounting the three dimensional optical sensor outside the perimeter of the display panel increases the transfer of light from the panel to the user because there are no layers that are part of the display system attached to the transparent layer that reduce the light transfer or degrade the clarity of the image produced by the panel. Mounting the optical sensor behind the transparent layer of the display can protect the optical sensor from being contaminated with foreign substances such as dust. If the field of view of the optical sensor became contaminated with a foreign substance over the transparent layer obstructing the optical sensors field of view the transparent layer may be cleaned without making separate provisions for cleaning the optical sensor.

Referring to the figures, FIG. 1a is a display system 100 according to an exemplary embodiment of the invention. The display system 100 includes a panel 110 and a transparent layer 105 in front of the surface 116 of the panel 110 for displaying images. The front of the panel 110 is the surface 116 that displays an image and the back of the panel 110 is opposite the front. A three dimensional optical sensor 115 can be on the same side of the transparent layer as the panel 110. The transparent layer 105 can be glass, plastic, or another transparent material. The panel 110 may be a liquid crystal display (LCD) panel, a plasma display, a cathode ray tube (CRT), an OLED or a projection display such as digital light processing (DLP), for example. Mounting the three dimensional optical sensors in an area of the display system 100 that is outside of the perimeter 117 of the surface 116 of the panel 110 provides that the clarity of the transparent layer is not reduced by the three dimensional optical sensor.

The three dimensional optical sensor 115 can determine the depth from the three dimensional optical sensor of an object located in the field of view 135 of the three dimensional optical sensor 115. The depth of the object can be used in one embodiment to determine if the object is in contact with the display. The depth of the object can be used in one embodiment to determine if the object is within a programmed distance 130 of the display but not contacting the display. For example the object 120 may be a user's hand and finger approaching the transparent layer 105.

If the object 120 is within the field of view 135 of the three dimensional optical sensor 115, light from the light source 125 can reflect from the object and be captured by the three dimensional optical sensor 115. The distance the object 120 is from the three dimensional optical sensor 115 can be used to determine the distance the object is from the display system 100. If the object is between a programmed distance 130 and the display system 100 a computing device may perform a function, for example a hover.

In some embodiments, a prism 112 is used to bend the reflected light from the object to the optical sensor. The prism 112 can allow the optical sensor to see along the surface of the transparent layer 105. The prism 112 can be attached to the transparent layer 105. The prism 112 is a transparent body that is bounded in part by two nonparallel plane faces and is used to refract or disperse a beam of light. In an embodiment the prism 112 refracts a beam of light emitted from a light source 125 through the transparent layer 105 to reflect from an object and return through the transparent layer 205 to the three dimensional optical sensor 115.

Figure 1B:
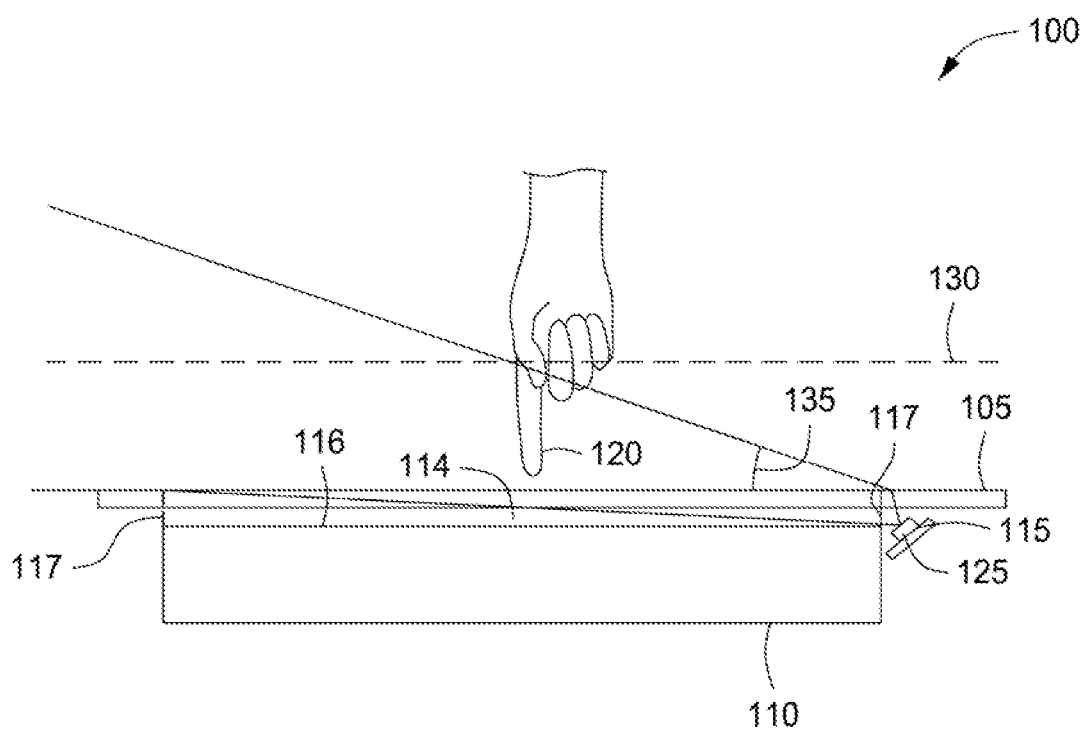
FIG. 1b is a display according town exemplary embodiment of the invention.

FIG. 1b includes a gap 114 between the transparent layer 105 and the panel 110. The gap allows the three dimensional optical sensor 115 to have a field of view of the transparent layer 105 from between the transparent layer 105 and the panel 110. The gap may be for example from 0.1 centimeters to 0.5 centimeters but the gap may be other amounts. The field of view of the three dimensional optical sensor 115 includes the perimeter 117 on the transparent layer 105.

In one embodiment, the optical sensor can be configured after attaching the optical sensor to the panel. For example, after attaching the optical sensor to the display a computer displaying information on the panel can be trained by displaying objects on the panel. The user can then contact the display where the objects are displayed on the panel and the computer can calibrate the optical sensor so that future contact with the display is interpreted by the computer as a contact of the display.

Figure 2:
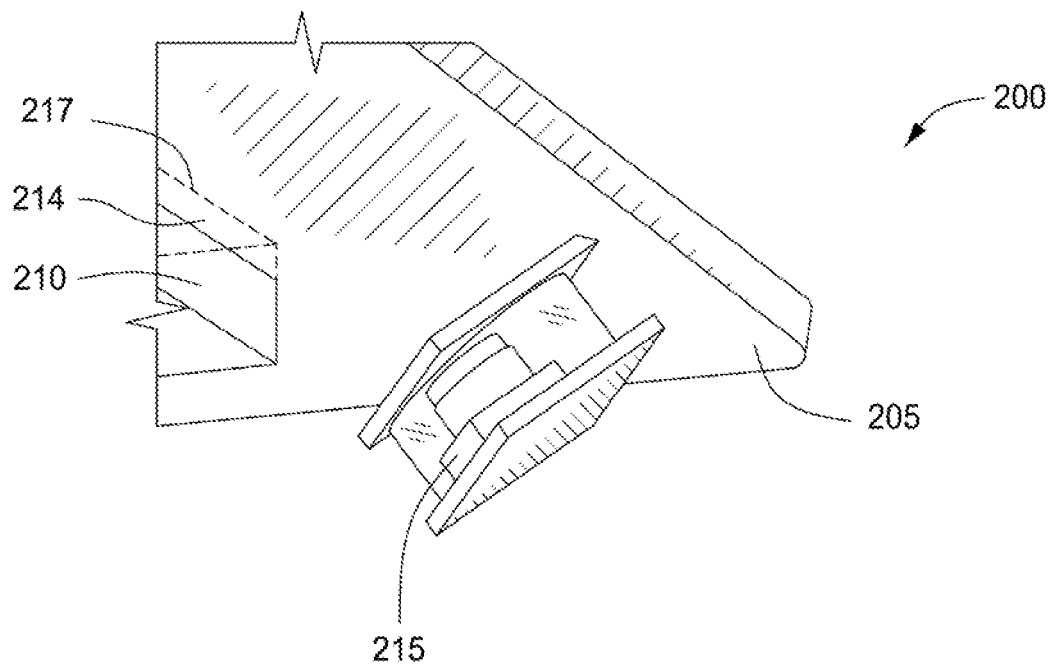
FIG. 2 is a portion of the display according to an exemplary embodiment of the invention.

FIG. 2 is a portion of the display 200 according to an exemplary embodiment of the invention. The portion of the display 200 includes a three dimensional optical sensor 215 mounted at an angle to the transparent layer 205. The angle of the three dimensional optical sensor is determined so that the field of view of the three dimensional optical sensor 215 includes the portion of the transparent layer 205 corresponding to a perimeter 217 of the display panel 210. In one embodiment a gap 214 is between the display panel 210 and the transparent layer 205. The field of view can be determined by the lens on the three dimensional optical sensor 215. The field of view may be measured in degrees, for example the three dimensional optical sensor that has a field of view of 100 degrees can capture images that a three dimensional optical sensor with a field of view of 50 degrees would not capture.

Figure 3:
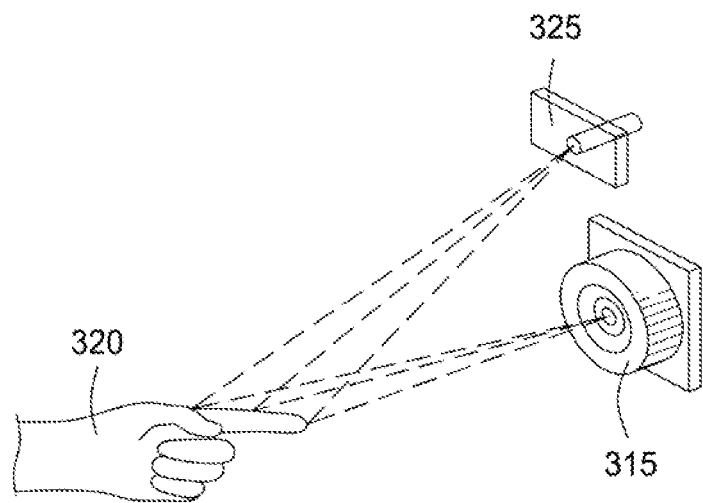
FIG. 3 is a three dimensional optical sensor according to an exemplary embodiment of the invention.

FIG. 3 is a three dimensional optical sensor 315 according to an exemplary embodiment of the invention. The three dimensional optical sensor 315 can receive light from a source 325 reflected from an object 320. The light source 325 may be for example an infrared light or a laser light source that emits light that is invisible to the user. The light source 325 can be in any position relative to the three dimensional optical sensor 315 that allows the light to reflect off the object 320 and be captured by the three dimensional optical sensor 315. The infrared light can reflect from an object 320 that may be the user's hand, in one embodiment and is captured by the three dimensional optical sensor 315. An object in a three dimensional image is mapped to different planes giving a Z-order, order in distance, for each object. The Z-order can enable a computer program to distinguish the foreground objects from the background and can enable a computer program to determine the distance the object is from the display.

Two dimensional sensors that use a triangulation based methods such as stereo may involve intensive image processing to approximate the depth of objects. The two dimensional image processing uses data from a sensor and processes the data to generate data that is normally not available from a two dimensional sensor. Intensive image processing may not be used for a three dimensional sensor because the data from the three dimensional sensor includes depth data. For example, the image processing for a time of flight three dimensional optical sensor may involve a simple table-lookup to map the sensor reading to the distance of an object from the display. The time of flight sensor determines the depth from the sensor of an object from the time that it takes for light to travel from a known source, reflect from an object and return to the three dimensional optical sensor. The depth of an object in the image can be determined from the three dimensional optical sensor that does not use a second three dimensional optical sensor to determine the distance of the object in the image.

In an alternative embodiment the light source can emit structured light that is the projection of a light pattern such as a plane, grid, or more complex shape at a known angle onto an object. The way that the light pattern deforms when striking surfaces allows vision systems to calculate the depth and surface information of the objects in the scene. Integral Imaging is a technique which provides a full parallax stereoscopic view. To record the information of an object, a micro lens array in conjunction with a high resolution optical sensor is used. Due to a different position of each micro lens with respect to the imaged object, multiple perspectives of the object can be imaged onto an optical sensor. The recorded image that contains elemental images from each micro lens can be electronically transferred and then reconstructed in image processing. In some embodiments the integral imaging lenses can have different focal lengths and the objects depth is determined based on if the object is in focus, a focus sensor, or out of focus, a defocus sensor. The embodiments of the invention are not limited to the type of three dimensional optical sensors that have been described but may be any type of three dimensional sensor.

Figure 4:
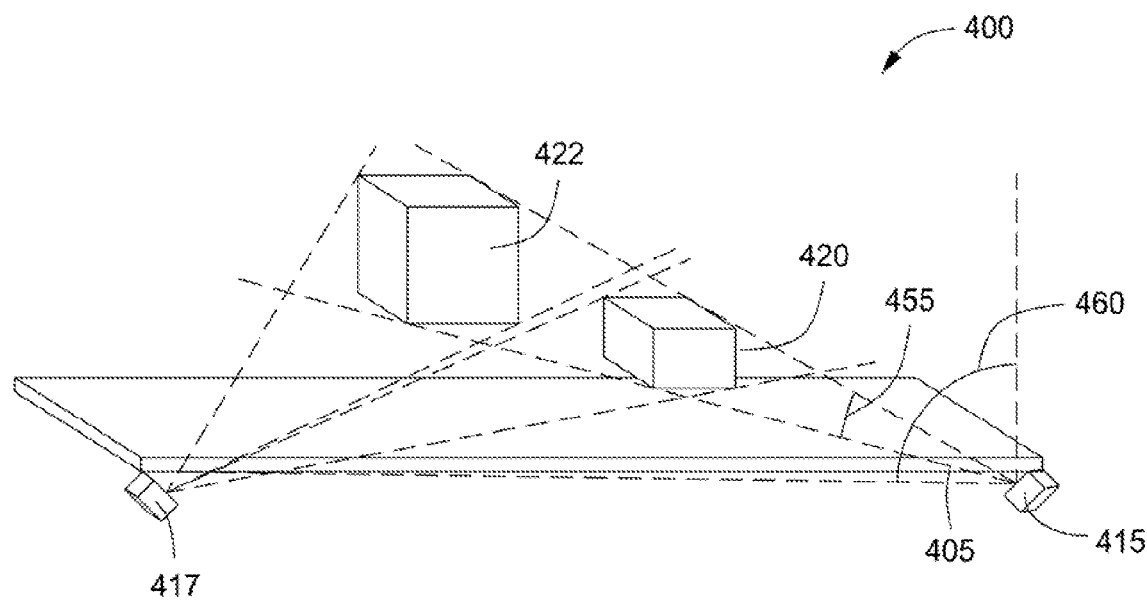
FIG. 4 is a display according to an exemplary embodiment of the invention.

FIG. 4 is a display according to an exemplary embodiment of the invention. In some GUIs a display system 400 that can sense more than one object 420 may be able to perform tasks within a program that would not be recognized by a single contact. For example, moving two fingers apart may zoom in on an item and moving two fingers together may zoom out on an item.

In one embodiment, there is a first three dimensional optical sensor 415 and a second three dimensional optical sensor 417. The first three dimensional optical sensor 415 may have a field of view 460. In an embodiment that includes a gap between the transparent layer 405 and the panel a portion of the field of view may be behind the transparent layer 405.

Within the field of view 460 an image of object 420 is captured. A second object 422 cannot be seen by the first three dimensional optical sensor 415 because the first object 420 is between the first three dimensional optical sensor 415 and the second object 422. The field of view 460 is obstructed by the first object 420 along the portion 455 of the field of view 460 in the volume 465 beyond the first object 420. The second three dimensional optical sensor 417 can capture within its field of view an image including the depth of both the first object 420 and the second object 422. The first three dimensional optical sensor 415 can determine the distance of a first object 420, for example a user's finger. The first three dimensional optical sensor 415 may not be able to capture a second object 422, for example a finger on a user's other hand if the view by the first three dimensional optical sensor 415 of the second object 422 is obstructed by a the first object 420. The first three dimensional optical sensor 415 and the second three dimensional optical sensor 417 may be in the corners of the display system 400 or the optical sensors may be located anywhere in or on the display such as the top, bottom, or sides.

A three dimensional optical sensor can be used to determine the size of objects because the depth from the optical sensor is known. If the depth from the optical sensor is not known the image of an object 420 may appear the same as a larger object 422 that is further away from the optical sensor 415. The size of the object may be used by the computing system to determine the type of object, such as a hand, finger, pen, or another object.

Figure 5:
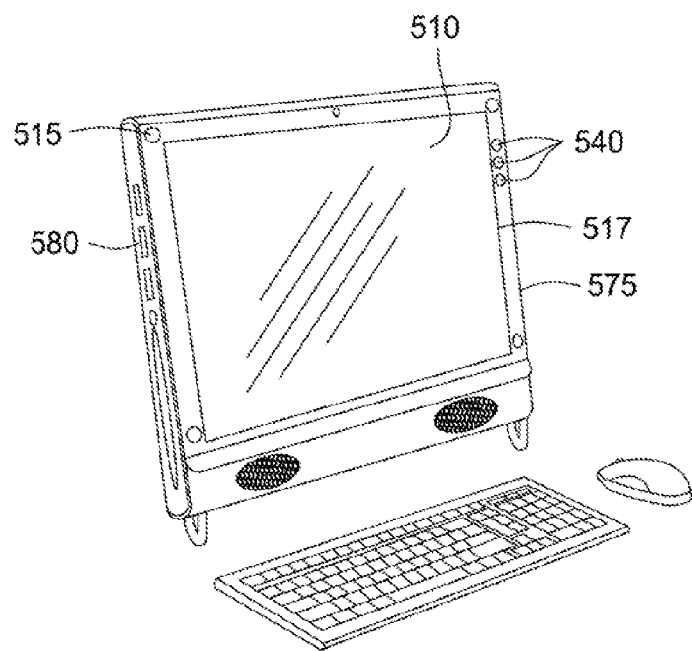
FIG. 5 is a display according to an exemplary embodiment of the invention.

FIG. 5 is a display according to an exemplary embodiment of the invention. The optical sensor has a viewable area that extends beyond the perimeter 517 of the display panel 510. The movement of objects beyond the perimeter 517 can activate functions of a computer system. In one embodiment, virtual buttons 540 can be located outside of the display panel 510. The virtual buttons 540 may be a symbol or text printed on the bezel 570 that surround the display panel 510. The virtual buttons have no moving parts and are not electrically connected to the computer system 580. The optical sensor 515 can detect when an object such as a user's finger has contacted a virtual button 540. In one embodiment, the display system may be enclosed in a housing that also encloses a computing system 580 or the computing system may be in a separate housing from the housing of the display system.

In one embodiment, a user may control functions such as volume by moving their hand in an upward or downward motion along the side 575 of the display system 500. The side of the display can be the area outside the perimeter of the panel 510 and may include the area beyond the transparent layer. Examples of other functions that may be controlled by a user's hand along the side of the display panel are media controls such as fast forward and rewind and presentation controls such as moving to the next slide or a previous slide.

A user may program functions that the computer implements upon detecting certain movements. For example, a user may flip the page of the document on the display by moving their hand above the display from right to left to turn to the next page or left to right to turn to the previous page. In another example a user may move their hands in a motion that represents grabbing an object on the screen and rotating the object to rotate the object in a clockwise or counterclockwise direction. The user interface can allow the user to change the results of the hand motions that are detected by the three dimensional optical sensor. For example if the user moves their hand in front of the display in a right to left direction the computer can be programmed to interpret the motion as the flipping of a page or as closing a document.

Figure 6:
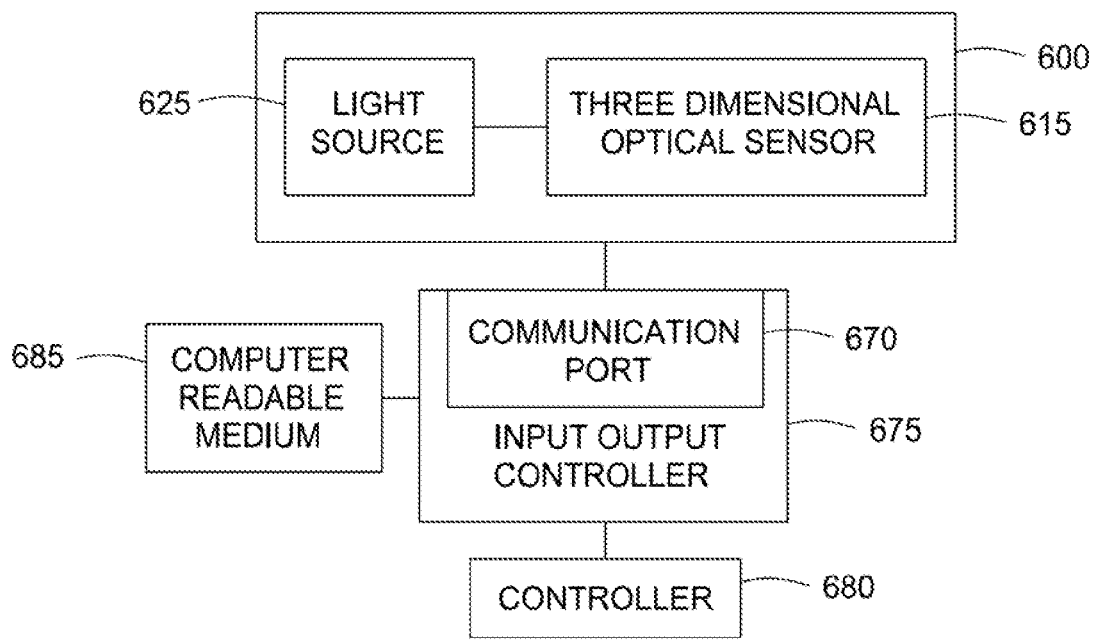
FIG. 6 is a block diagram according to an exemplary embodiment of the invention.

FIG. 6 is a block diagram according to an exemplary embodiment of the invention. The optical sensor module 600 includes the light source 625 and the optical sensor 615. The optical sensor module 600 can capture data that may include height, width, and depth of an object in an image. The optical sensor module 600 can connect to a communication port 670 to transmit captured data to a computing device. The communication port 670 can be a communication port 670 on a computing device. For example the communication port 670 can be a universal serial bus (USB) port or an IEEE 1394 port. The communication port 670 may be part of the input output controller 675 of the computing device, in one embodiment. The input output controller 675 can be connected to a computer readable medium 685. The input output controller 675 of a computing device can connect to a controller 680.

The controller 680 can receive data captured by the three dimensional optical sensor module 625 through the communication port 670 of the input output controller 675. The controller 680 can determine from the data captured by the three dimensional optical sensor module 600 the distance an object is from the optical sensor module 600. The controller 680 can determine the distance the object is from a display based on the distance the object is from the three dimensional optical sensor module 600. In one embodiment, the controller 680 is a processor or an application specific integrated circuit (ASIC).

A computing system including the controller 680 can use the data to determine if a hover can be indicated by the panel. A hover refers to a GUI event that occurs if the user moves or hovers a cursor over a particular area of the GUI. Hover events can be use in website design and are used in modern GUI programming. Their existence might not even be known to the user as the events can be used to call any function and might affect only the internal workings of the operating system or application on a computing system.

Figure 7:
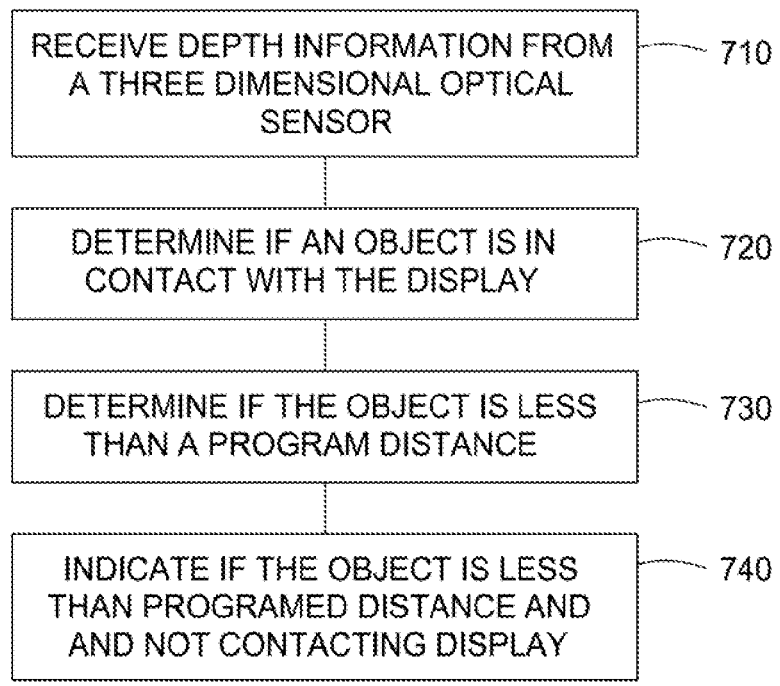
FIG. 7 is a flow diagram according to an exemplary embodiment of the method of the invention.

FIG. 7 is a flow diagram according to an exemplary embodiment of the method of the invention. The method begins by receiving depth information from a three dimensional optical sensor (at 710). The depth information includes the depth from the three dimensional optical sensor of objects in the field of view of the three dimensional optical sensor. For example, the three dimensional optical sensor may use time of flight, structured light, integral imaging or focus defocus to generate the depth information. The depth information can be received by a computing device. The computing device can be for example a computer system, a personal digital assistant or a cellular phone. The computing device can determine from the depth information if an object is contacting a display system (at 720). The computing device may determine from the depth information that the object is contacting the display if the distance of the object from the display system is substantially zero centimeters. In one embodiment, substantially zero means that the resolution of the three dimensional optical sensor may not be able to determine contact with the display and an object that is less than a contact distance from the display system may have depth information from the three dimensional optical sensor that is determined by the computing device to be a distance of zero and a contact with the display system. A contact distance may be for example 0.2 centimeters from the display system but may be other distances. If the object comes in contact with the transparent layer the calculated distance that the object is from the display is zero. If the computer receives a signal that the distance is zero the computer can generate an activation of the icon if the computer determines that location of the object and the location of the image of the icon displayed on the panel correspond to each other. For example, the icon can represent a program that will be launched if the icon is activated.

The computing device can determine from the depth information if the object is less than a programmed distance (at 730). The programmed distance is a distance that the computer objects in the field of view of the optical sensor begin to be recognized as an object that may perform a function. A display can indicate on the display if the object is not contacting the display and the object is less than the programmed distance (at 740).

A location on the display panel may correspond to an item being displayed on the display such as an icon. If the object is calculated to be within a programmed distance from the display the computer may interpret a hover action. The icon may have a programmed action that occurs if a hover event is detected at the location of the icon on the display. For example a portion of the display, such as an icon, can be highlighted if the object is not contacting the transparent layer but is less than programmed distance from the transparent layer.

The techniques described above may be embodied in a computer-readable medium for configuring a computing system to execute the method. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and various types of computer-readable media may be used to store and/or transmit the software modules discussed herein. Computing systems may be found in many forms including but not limited to mainframes, minicomputers, servers, workstations, personal computers, notepads, personal digital assistants, various wireless devices and embedded systems, just to name a few.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A display system comprising:
   a panel to display images on a front side;
   a three dimensional optical sensor to determine depth from the three dimensional optical sensor of an object located in a field of view of the three dimensional optical sensor;
   a transparent layer in front of the front side of the panel and the three dimensional optical sensor; and
   a prism between the transparent layer and the three dimensional optical sensor.

2. The system of claim 1, further comprising a second three dimensional optical sensor to determine a depth from the second three dimensional optical sensor of the object located in a field of view of the second three dimensional optical sensor.

3. The system of claim 1, further comprising a computing device connected to the panel and to the three dimensional optical sensor; wherein the computing device is to indicate a hover if the object is not in contact with the display system and is less than a programmed distance from the display system.

4. The system of claim 1, wherein the three dimensional optical sensor is attached outside of a perimeter of the panel.

5. The system of claim 1, further comprising a gap between the panel and the transparent layer, wherein the gap allows the three dimensional optical sensor to have the field of view include between the transparent layer and the panel.

6. The system of claim 1, wherein the three dimensional optical sensor is selected from the group consisting of a time of flight sensor, a structured light sensor, focus sensor, and a defocus sensor.

7. A method comprising:
   generating, by a three dimensional optical sensor, depth information about an object in a field of view of the three dimensional optical sensor, based on light reflected from the object received at the three dimensional optical sensor;
   determining from the depth information if an object is contacting a display system, wherein the object is determined to be contacting the display system if the object is less than a contact distance from the display system;
   determining from the depth information if the object is less than a programmed distance; and
   indicating on the display system if the object is between the contact distance and the programmed distance.

8. The method of claim 7, wherein the display system includes a transparent layer in front of a panel and the three dimensional optical sensor.

9. The method of claim 7, further comprising determining a location of the object and determining a location of an image displayed on the display system.

10. The method of claim 7, further comprising generating depth information from a group consisting of time of flight information, structured light information, focus depth information and defocus depth information.

11. The method of claim 7, wherein indicating on the display system includes highlighting a portion of an image on the display system.

12. The method of claim 7, further comprising generating an activation if the object is determined to be in contact with the display system.

13. A non-transitory computer readable medium comprising instructions that if executed cause a processor to:
   receive depth information from a three dimensional optical sensor;
   determine from the depth information if an object is contacting a display system, wherein the object is determined to be contacting the display system if the object is less than a contact distance from the display system;
   determine from the depth information if the object is less than a programmed distance from the display system; and
   indicate a hover on the display system if the object is determined from the depth information to be between the contact distance and the programmed distance.

14. The non-transitory computer readable medium of claim 13, further comprising instructions to generate a hover if the object is not in contact with the display system and is less than a programmed distance from the display system.

15. The non-transitory computer readable medium of claim 13, further comprising instructions to generate an activation of an item on the display system if the object is in contact with the display system.

16. The system of claim 1, wherein the prism is to refract light from the object to the three dimensional optical sensor so that the three dimensional optical sensor can see along a surface of the transparent layer.

17. The system of claim 1, wherein the three dimensional optical sensor is mounted at an angle to the transparent layer, the angle determining the field of view of the three dimensional optical sensor.

18. The method of claim 7, further comprising receiving, at the three dimensional optical sensor, light reflected from the object and propagated through a prism.

* * * * *